April 20, 1965 R. BOUTIGNY ETAL 3,179,390

MULTI-ZONE PUSHER TYPE FURNACE AND PROCESS FOR HEATING FLAT INGOTS OR SLABS, OR LIKE PRODUCTS

Filed June 12, 1962 6 Sheets-Sheet 1

Inventors:
Robert Boutigny
Maurice Rimadieu
by: Michael S. Striker
Attorney

Inventors:
Robert Boutigny
Maurice Amadieu
by Michael S. Striker
Atty

Inventors:
Robert Boutigny
Pierre Amadieu
by: Michael S. Striker
Atty.

MULTI-ZONE PUSHER TYPE FURNACE AND PROCESS FOR HEATING FLAT INGOTS OR SLABS, OR LIKE PRODUCTS

Filed June 12, 1962

Inventors:
Robert Boutigny
Maurice Amadieu
by: Michael S. Striker
Attorney

Inventors:
Robert Boutigny
Maurice Audadieu
by:
Michael S. Striker
Atty

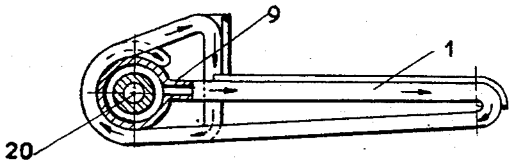
Fig. 17.
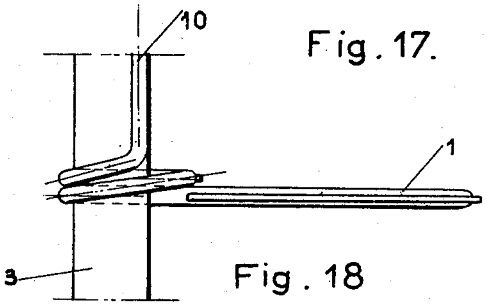
Fig. 18
Fig. 19
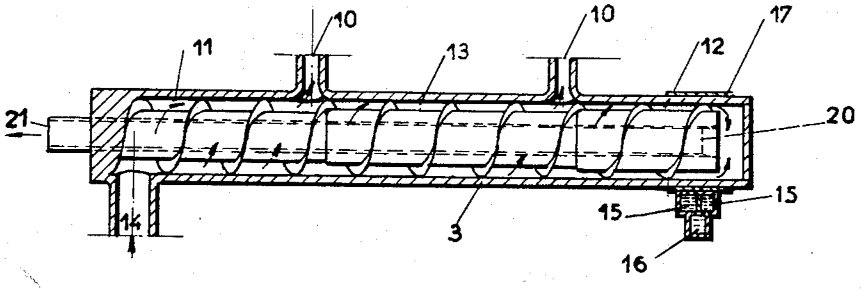
Inventors:
Robert Boutigny
Maurice Amadieu
by:
Michael S. Striker
Attorney

United States Patent Office 3,179,390
Patented Apr. 20, 1965

3,179,390
MULTI-ZONE PUSHER TYPE FURNACE AND PROCESS FOR HEATING FLAT INGOTS OR SLABS, OR LIKE PRODUCTS
Robert Boutigny and Maurice Amadieu, Paris, France, assignors to Stein & Roubaix, Paris, France, a company of France
Filed June 12, 1962, Ser. No. 201,862
Claims priority, application France, June 27, 1961, 866,208
11 Claims. (Cl. 263—6)

In the construction of heating furnaces which heat metal work (blooms, slabs, etc.) to their rolling temperature—which, in the case of mild steels, reaches 1250° C. on exit from the furnace—it is customary, with presently known installations, to employ multi-zone pusher type furnaces comprising, say, three, four, five or more zones, in particular when the depth of the work to be heated may reach 300 mm. or more. These different zones are heated with the usual fuels. FIGURES 1 and 2 of the accompanying drawing schematically illustrate, in longitudinal and cross-section respectively, the interior layout of a furnace of this type.

In order to permit production rates that are in step with the capacity of the rolling mills being supplied, numerous furnaces have been so constructed as to permit travel of the work $a$ (slabs, for instance) from the entrance to the exit of the furnace. This is achieved by utilizing partly insulated, water-cooled slipways $b$ on which the work $a$ is pushed by suitable devices, such as a pusher $c$, placed outside and at the head of the furnace.

As it travels through the furnace, the work to be heated $a$, disposed crosswise in the furnace, is subjected to radiation from the walls and the fire, from both above and below, in order to ensure the required temperature homogeneousness through the body of the work.

The effective length L of such furnaces is limited by the extent to which the work may be pushed without overlapping or humping.

It has been observed that the water-cooled slipway $b$ leave "black traces" on the work before its entry into the equalization zone E of the furnace—into which the slipways do not extend—and that these "black traces" do not fully disappear in the equalization zone.

In addition, it is necessary to support the slipways by means of likewise water-cooled columns $d$ in the lower heating zone. The radiation on the work in these zones is hampered by the presence of the columns $d$ and by the insulating materials used for the horizontal slipways. As a result, differences may exist between the temperatures of the upper and lower surfaces of the slabs, which may not be fully absorbed during the time required for the work to pass through the equalization zone E of FIGURE 1.

In the case of furnaces with a high production capacity, the aforementioned two defects may result, on the one hand, in an asymmetrical heating of the upper and lower portions of the work $a$ and, on the other hand, in incipient "black traces," of the type referred to precedingly. This asymmetry is a major problem for hot rolling mill operators, while the presence of "black traces" is in turn an obstacle to cold rolling, as these traces make it more difficult to ensure the required uniformity of thickness, particularly in the cases of sheet-steel used for bodywork, or tin-plate.

A number of meausres have been resorted to with a view to decreasing the extent of these "black traces" in these types of furnaces. One notable step has been to equip the cooled slipways $b$ with "jumpers" $e$ (see FIGURE 4) in refractory steel, of a height such that the difference between the temperature of these "jumpers" and that of the lower surface of the work to be heated, with which the "jumpers" are in contact, is at a minimum. FIGURE 3 shows a cross-section of a customarily employed cooled slipway $b$ while FIGURE 4 shows a cross-section of a slipway $b$ provided with "jumpers" $e$.

Efforts in this direction have been limited by the resistance of the refractory steels utilized for the "jumpers," as well as by the ability of these steels to withstand large friction loads at high temperatures.

It is furthermore necessary that any "jumpers" that may remain uncovered—particularly when short slabs are being passed through the furnace, i.e. slabs whose lengths are markedly less than the width of the furnaces—should be able to retain a degree of resistance that is enough for them to be able to accept fresh, longer slabs without sustaining abnormal wear, after the "jumpers" have been exposed to the flames.

Lastly, while the use of these "jumpers" has unquestionably resulted in some attenuation of the "black traces," this technique is more difficult to reconcile with the high production rates (kg./hr./sq. m. of covered furnace area) presently feasible with rich-fuel-fired, large-capacity furnaces.

In brief, although successful efforts have heretofore been made in an attempt to overcome the "black traces" and asymmetry defects referred to, the problem has not been wholly solved, not merely in the context of present-day need, but in that of future needs especially, for one may already expect still more stringent requirements in respect of the quality of the heating, the uniformity of the thickness resulting therefrom, and the rates of production.

The foregoing may be schematized more concretely by FIGURES 5 and 6, which illustrate a lateral end portion of a slab as it enters the equalization zone E on ordinary slipways $b$ (see FIGURE 5), then on slipways provided with "jumpers" $e$ (FIGURE 6); an indication having been given in each case, by way of example and for a slab thickness of 200 mm., say, of the temperature of the slab on its upper face, its lower face and at its points of contact on the slipways.

This invention provides a means of accentuating the extent to which both the heating asymmetry of the slabs and the "black traces" thereon may be suppressed, while at the same time not only retaining high production rates but even stepping them up, with a view to satisfying the requirements of both hot and cold rolling mills.

In accordance with the invention, this end is achieved by turning over the work, either inside a same furnace or across two complementary and distinct furnaces, at the end of the heating phase and before the equalization zone, under conditions preferably such that, as the result of this turning-over process, the previously bottom faces of the work are heated, so that on emerging from the furnace they attain substantially the same temperature as the previously top faces.

In this manner, as may be clearly seen from FIGURE 7, which shows a portion of the slab immediately after it has been turned over, the upper and lower face temperatures of FIGURE 5 are reversed.

Various devices may be resorted to for effecting the actual turning over of the work, provided that they be adapted to withstand, and to operate under, the furnace temperatures to be expected (of the order, say, of 1300° C.) and to perform the turning over of the work without subjecting the same to knocks that could damage the work, the turn-over device, or the furnace itself.

In a preferred embodiment, the turn-over device comprises two sets of heeled levers ("upstream" and "downstream" levers, with reference to the direction of travel of the work), fixedly mounted on two parallel shafts set at right angles to the furnace and each adapted to pivot through about 100 to 110°; whereby each set of levers is caused to describe a to-and-fro rotation of identical amplitude above, and starting from, the level of travel of the work, the respective directions of rotation and speeds of the two sets of levers being so combined that, in a first stage, the two sets of levers start from the horizontal and first rotate upwardly in opposite directions and at different speeds toward but without touching each other, then, in a second stage, and before the "upstream" levers have reached the vertical, rotate at the same speed and in a common direction that is the initial direction of the "upstream" levers until the "upstream" set of levers has overstepped the vertical, and, lastly, in a third stage, the "upstream" set of levers reverse its rotation and rotates at a different speed, as a result of which the two sets of levers move away from one another and revert simultaneously to their respective starting points.

Thus, during the first stage, the work is raised by the "upstream" levers and begins a circular turning-over motion as it rests upon that set of levers. During the second stage, the work pursues its turning-over motion, during which phase it is supported and guided by the two sets of levers in succession. During the third stage, the "upstream" levers cease to accompany the "downstream" levers, the said "downstream" levers pursuing alone the semi-circular turning-over stroke and depositing the work in the equalization zone. In this way, the work is turned over smoothly.

In order to impart to such a device the necessary resistance and the ability to operate in a furnace capable of reaching temperatures of the order of 1300 to 1350° C., a cooling system is provided for the levers, for the shafts actuating them and for the bearings supporting the shafts inside the furnace.

In accordance with a further particularity of this invention, which may be combined with advantage with the turn-over device, the vertical columns which customarily support the slipways in the heating zones are replaced by water-cooled interrupted arches. Such interrupted arches, while providing a charging and bearing capacity at least equal to that of conventional columns, permit a full development of the flames in the lower furnace zones and consequently reduce the screening effect on the burner flames. This screening effect, which is due to the presence of the plurality of vertical columns in classic furnaces, is one of the reasons for the differences in temperature above and below the flames, these differences being exemplified on FIGURES 5 and 6.

It is to be noted that, in installations resorted to heretofore, the pushing distance along the slipways, for a given depth of work such as in the case of slabs, for instance, is limited in order to avoid an overlapping or humping effect. In accordance with this invention, the pushing distance no longer intervenes upstream of the slab turn-over device. This increases the production capacity of the furnace, since the effective heating area is increased by that existing downstream of the turn-over device, in the equalization zone.

After the slabs have been turned over, the furnace is thus extended by the equalization zone, in which the forward travel of the slabs may be ensured, for instance, along longitudinal girders, in conjunction with a pulling device utilized in the manner well known per se. The hearth, which consists of refractory girders, is so adapted in accordance with this invention as to ensure that the loss of calories sustained by the now bottom faces of the slabs (which, prior to turning over, were the upper faces and hence the hotter faces) shall not exceed a certain value, so that a slab emerging from the furnace shall have identical upper and lower face temperatures, thereby eliminating the aforementioned asymmetry and, with it, the "black traces."

With this same end in view, provision is made in accordance with the invention such that, before the turning over process, the temperature of the previously upper face shall be higher than the desired exit temperature, in order to make allowance for the controlled drop in temperature, after turning over, of the said previously upper, but subsequently lower, face during its sojourn in the equalization zone. It will of course be understood that, during this stay in the equalization zone, the previously lower face undergoes heating, so that, in time, the same exit temperature required for both faces is obtained.

The foregoing will be made still further manifest in the following detailed description, given by way of example only and not limitation, with reference to the accompanying drawings for the illustrated embodiment of the invention, and wherein:

FIGURES 17 and 18 are detail side elevation and plan views, respectively, of a lever with its cooling system;

FIGURE 19 is a longitudinal section view of a shaft on which is mounted a set of levers of the turn-over device of the invention.

Figure 1:
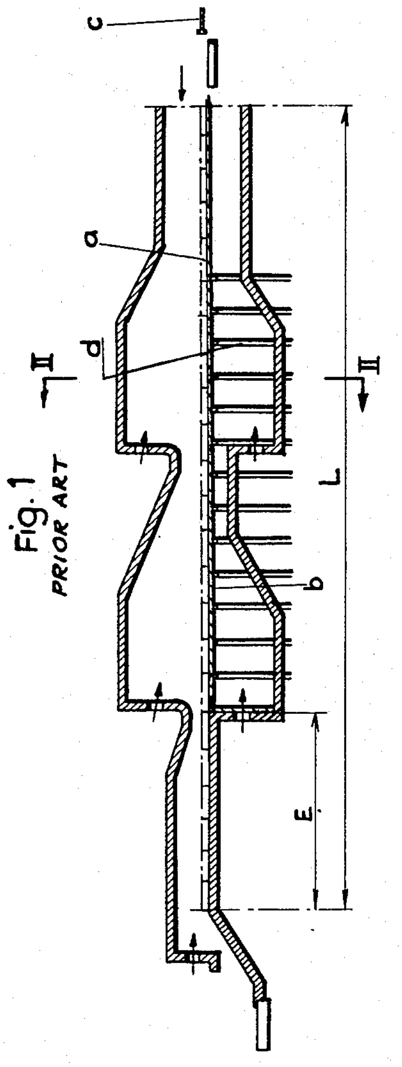
FIGURES 1 and 2 are respectively schematic longitudinal and cross-section views of a conventional multizone pusher-type furnace, having already been referred to in the above preamble to the detailed description.
Figure 2:
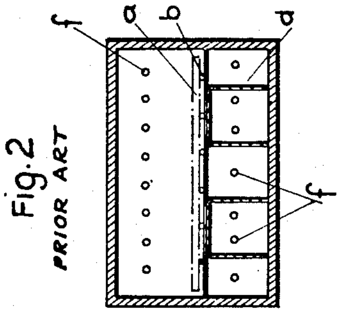
Figure 7:
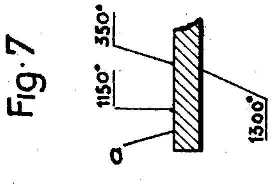
FIGURES 3 through 7 are detail views, which have likewise been referred to in the preamble.
Figure 6:
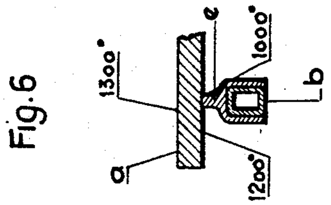
Figure 5:
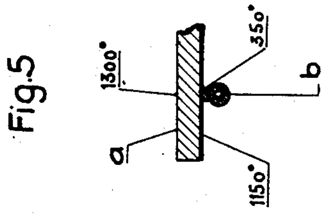
Figure 4:
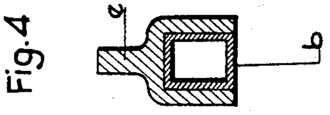
Figure 3:
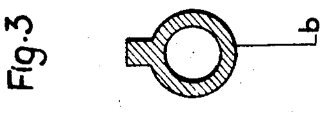
Figure 8:
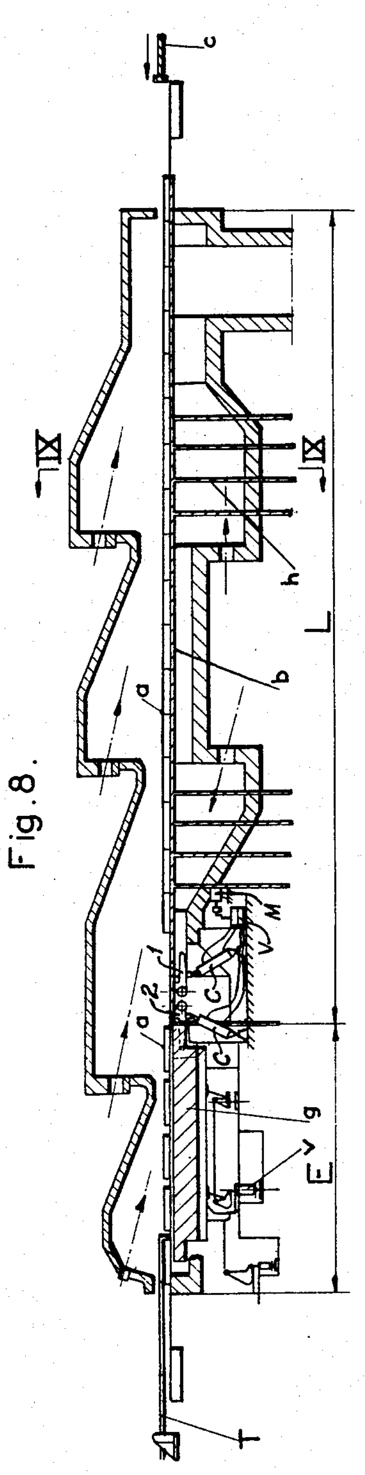
FIGURE 8 is a highly diagrammatic longitudinal section through a multi-zone pusher-type furnace embodying the particularities of this invention.
Figure 9:
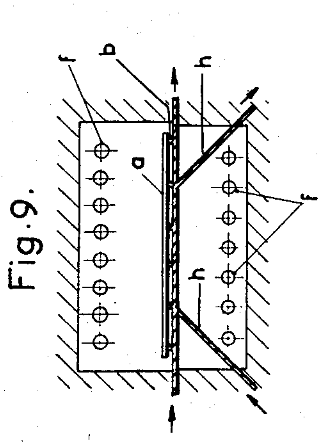
FIGURE 9 is a cross-section thereof, taken through the line IX—IX of FIGURE 8.
Figure 10:
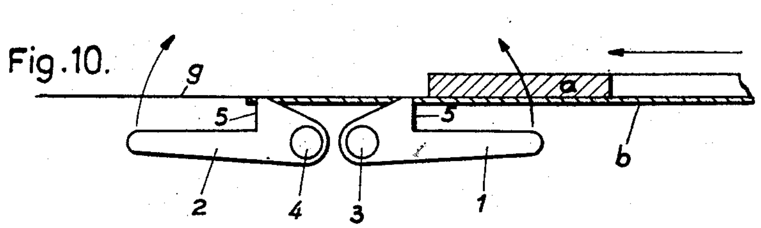
FIGURES 10 through 14 are schematic illustrations of the successive relative positions of the two sets of levers of the turn-over device according to the invention, in the course of their respective to-and-fro pivotal motions.
Figure 11:
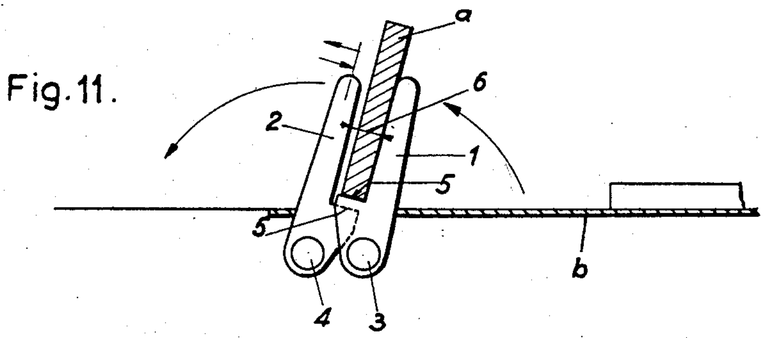

The furnace illustrated in FIGURES 8 and 9 is of the same type as that of FIGURES 1 and 2. It comprises, in particular, slipways *b* along which the work *a*, which may be flat ingots or slabs, for instance, is pushed by a pusher *c* placed outside and at the head of the furnace. The various slabs are arranged side by side and disposed crosswise in the furnace, i.e. their longer sides lie along the width of the furnace.

In accordance with this invention, the slipways *b* along which the slabs travel through the different heating zones are supported by water-cooled interrupted arches *h*, as shown by the arrows in FIGURE 9. These interrupted arches permit a full development of the flames in the lower zones of the furnace.

A turn-over device located at the end of the slipways is adapted to lift the flat pieces of work *a* and to turn them over so that their previously upper faces become their lower faces, and vice versa, this being accomplished prior to their entry into the equalization ozne E. The equalization zone E consists of refractory longitudinal girders *g* operated by a jacking device V and associated to a pulling device T for evacuating the work as it is deposited in the equalization zone by the turn-over device. Since the manner of execution of girder-type hearths is well known in the art and for instance described in the Patent No. 1,973,934 to Stevens, it will not be described in greater detail.

The turn-over device proper consists, in principle, of two sets of heeled levers (upstream levers 1 and downstream levers 2), fixedly mounted on two parallel horizontal shafts 3 and 4 placed transversely within the furnace and each capable of pivoting through 100 to 110°, whereby each set of levers is caused to describe, inside the said furnace, a to-and-fro pivotal motion of identical amplitude above, and starting from, the horizontal. The respective directions of rotation and speeds of the two sets of levers are furthermore so combined that, on starting from the horizontal, the levers first pivot upwardly in opposite directions and at different speeds until they meet without touching, before the upstream levers 1 have reached the vertical; that they then rotate at the same speed and in the same direction as the initial direction of the levers 1 until the set of levers 1 has overstepped the vertical; and that they finally rotate in opposite directions and at different speeds to enable them to revert simultaneously to their respective initial starting points. One form of lever lifting and controlling mechanism is shown by way of example in FIG. 8. The levers 1 and 2 are moved by fluid pressure cylinders C pivotally mounted at their lower ends. Flexible conduits connect the cylinder C to fluid flow regulating valves V. The latter are driven by a motor M through a speed reducer, so that the levers are driven in accordance with the sequence of steps listed above.

FIGURES 10 through 14 schematically illustrate the successive relative positions of the two sets of levers 1 and 2 in the course of their respective to-and-fro pivotal motions. These figures likewise show the motions of turning over the slab *a*, which is supported, in turn, by the upstream levers 1 and then by the downstream levers 2 in the course of the respective to-and-fro pivotal motions of the two sets of levers.

If now these motions be followed, in the successive order of FIGURES 10 to 14, it will be observed that, initially (see FIGURE 10), the slab is pushed along the slipways *b* into a position level with the levers 1. As the pivotal motion of the levers begins, the slab *a* is raised by the upstream levers 1, which, up to the position of FIGURE 12, alone perform the initial phase of turning the slab over. From the position of FIGURE 12 up to that of FIGURE 14, the slab pursues its circular turning-over movement, being borne and guided by both sets of levers, which, during this phase, remain parallel to one another as they describe a circular motion at the same speed and maintain a constant spacing 6 between them, which is set as close as possible to the maximum anticipated slab thickness.

In the course of this same phase (FIGURES 11 to 13), support for the slab is transferred from the heels 5 of the upstream levers 1 to the heels of the downstream levers 2. It will be observed that this transfer is effected without a fall being involved, since the combined circular motions of the levers, as illustrated in the figures referred to, cause the heels of the levers 1 to remain above those of the levers 2 and to support the slab until the vertical position is reached (see FIGURE 12), after which position the heels of the levers 1 gradually withdraw below those of the levers 2, which thenceforward take charge of the slab.

Concurrently with its transfer from the heels of the levers 1 to those of the levers 2, the slab initiates its turning over process as it moves from one set of heels to the other. This turning-over process, which occurs between the position of FIGURE 12 and the position of FIGURE 13, takes place without an appreciable drop, since the clearance between the levers as the slab is turned over is very small, particulalry in the case of thick slabs, and since, as stated precedingly, the spacing 6 between the levers is set as close as possible to the maximum slab thickness.

The spacing 6 could in fact be set variably, according to the different slab thickness, to enable the clearance between the levers and the slabs, and the resulting drop as a slab is turned over, to be reduced to a proportionate minimum for any slab thickness.

Figures 12, 13:
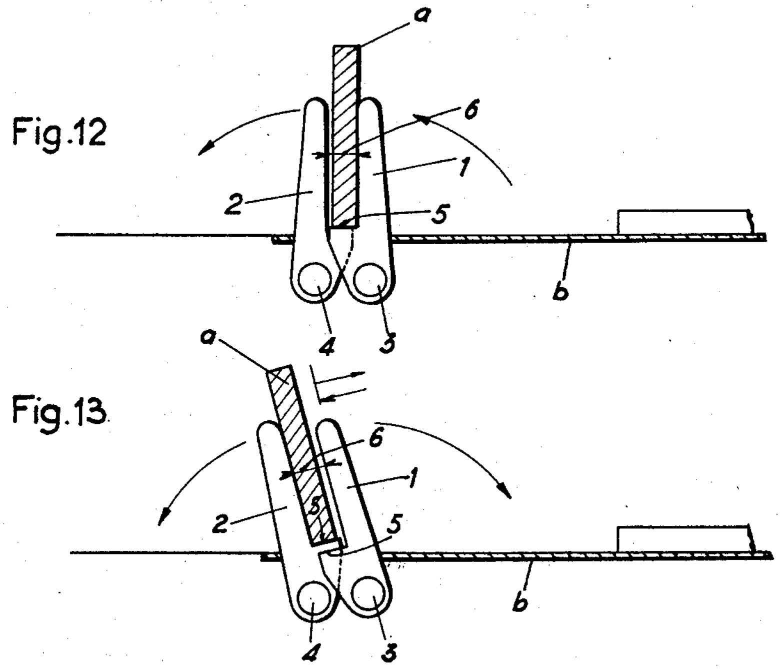
Figure 14:
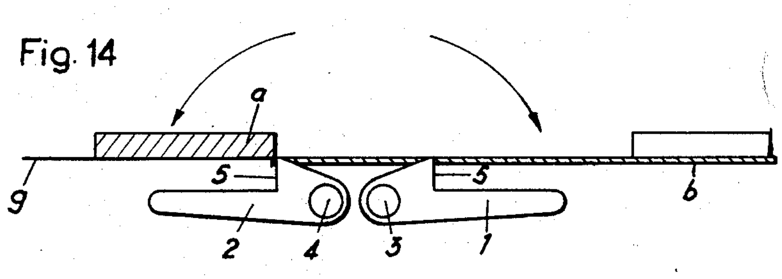

Onwardly from the position of FIGURE 13, wherein the upstream levers 1 cease to accompany the downstream levers 2 and begin their return travel toward their starting point, the downwstream levers 2 alone pursue the semi-circular motion of turning over the slab, and deposit the same on the girders *g*, or on any other portion of the zone E. Immediately afterwards, the motion of the two sets of levers is halted simultaneously, in the horizontal starting position shown in FIGURE 14.

The foregoing description will suffice to show that the device according to this invention is capable of turning over the slabs smoothly, since the same are provided with support throughout the process, and since the lever speeds relationship may be so adjusted that the speed at which the upstream arms 1 establish lifting contact off the slipways *b* and the speeds at which the downstream arms 2 take charge of the slab and deposit it on the girders *g*, are very small, or even null. This particularity consequently makes the device hereinbefore described well suited to the desired form of smooth operation.

In addition, both the resistance and the operational capabilities of this system inside a furnace, in ambient temperatures of the order of 1300 or 1350° C. for example, are obtained by the peculiarities of construction and lay-out which are set forth hereinafter and which likewise fall within the scope of this invention, being represented on FIGURES 15 through 20.

Figure 15:
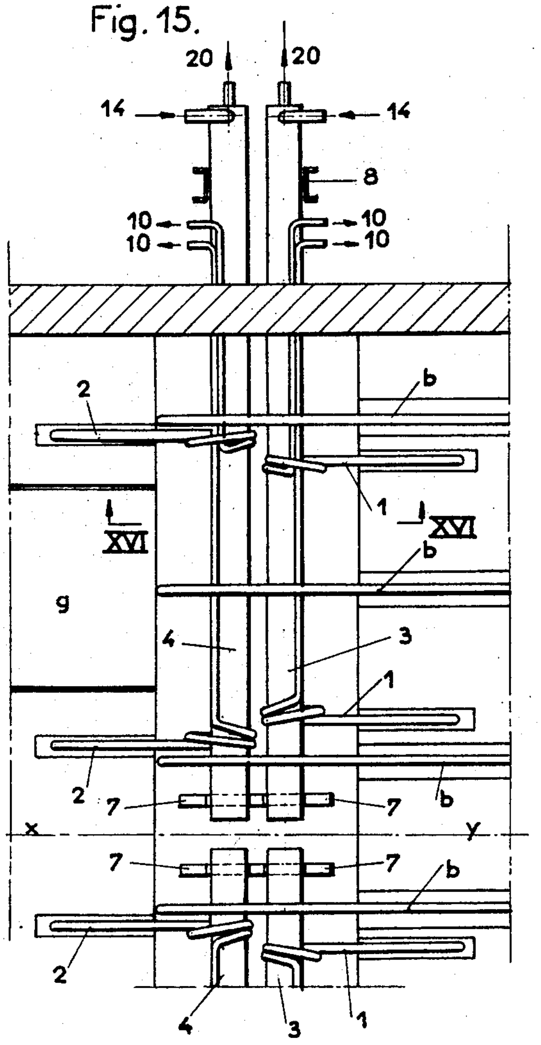
FIGURE 15 shows the complete turn-over assembly of this invention, as seen in planform inside a furnace.

Reference is now had to FIGURE 15, which is a plan view of the general lay-out of the turn-over device in the furnace. For the purposes of this representation, the very fullest type of installation has been considered, i.e. an installation involving a very wide furnace which is capable of heating very long slabs in a single row, or half-length slabs in two parallel rows.

To meet such conditions, which, for all practical purposes, will be the conditions generally obtaining in large slab-heating furnaces, the turn-over device is constituted in two groups that are identical but positioned symmetrically in relation to the furnace axis *x–y*. Each group comprises two water-cooled hollow parallel shafts 3 and 4, on each of which are fixedly mounted two heeled levers 1 and 2, which are likewise water-cooled. Each of the two shafts is supported in two bearings, of which one is a special water-cooled bearing 7, located within the furnace, and the other a non-water-cooled normal bearing 8, located outside the furnace.

If, contrarily to what has just been considered, the furnace were less wide and adapted only to heat relatively short slabs in a single row, the interior bearing 7 would be disposed externally like the bearing 8, and this would represent a simpler case.

In all cases, however, the shafts 3 and 4 are provided with a free extension external to the furnace, onto which are coupled the components of the pivotal motion control gear, which is not shown since it is external to the furnace and may be executed with mechanical or hydraulic devices in accordance with current practice.

Of course, it will be understood that this control gear outside the furnace will be required to impart, to the shafts 3 and 4, both the torques and the set relative motions whereby the turn-over levers may be actuated in accordance with the operating principle hereinbefore set forth with reference to FIGURES 10 through 14.

Furthermore, in the specific case of the two symmetrical turn-over groups considered hereinbefore, the control mechanism will be required to enable either simultaneous and synchronized operation of two groups for turning over long slabs charged in a single row, or separate operation of each group for enabling, if desired, separate turning over of the slabs when the same are charged in two rows. As may be seen in FIGURES 15 to 16, the levers 1 and 2 are disposed so that they insert themselves between both the slipways *b* and the girders *g*, while the shafts 3 and 4 are set at a level such that, in the halted position, the assembly comprising the levers and the turn-over device located inside the furance is wholly above the upper plane of the slipways and the girders. Such a disposition offers the advantage, on the one hand, of permitting removal from the side of the furnace of the lever and shaft assemblies without removing the slipways, and, on the other hand, of making it possible to service the furnace without necessarily operating the turn-over device. For this particular case, the slabs are pushed up as far as the girders, this being at all times possible as the slipways *b* run above the turn-over device, when the same is halted, and extend up to the girders *g*.

Figure 16:
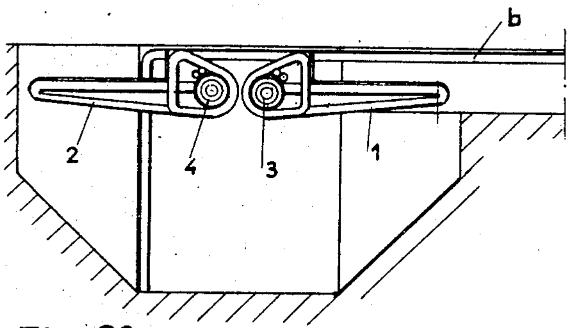
FIGURE 16 is a cross-section taken through the line XVI—XVI of FIGURE 15.
Figure 20:
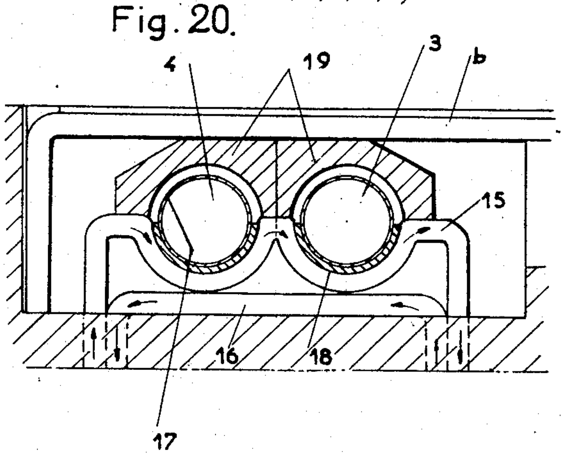
FIGURE 20 is a cross-sectional view showing an embodiment of a bearing supporting the shaft of FIGURE 19 inside a furnace.

The general lay-out of the turn-over device in the furnace having been defined with reference to FIGURES 15 to 16, reference is now had to FIGURES 17 through 20, which relate more specifically to the levers, shafts and interior bearings, in order to show in detail precisely how these parts are designed to enable them to reliably withstand the environment in which they are called upon to operate and to which they are continuously exposed.

This object is achieved, in the first place, by providing an individual internal cooling water circuit for each part, in such a way as to enable the cooling of each such part to be perfectly monitored and regulated from the exterior; in the second place, each part is designed so that its internal cooling circuit provides a constant circulation speed at all points through its section and along its path, and so that the thickness enveloping the circuit are uniform. This is achieved in such a way that, while it presents the necessary external profile and resistance to stress, each part is cooled uniformly throughout all its cross-sections, and is thus prevented from becoming distorted, regardless of the fact that the exposure of its outer surface to the flames is neither constant nor the same at all points.

With this concept and object in mind, each of said parts may be made to embody all or some only of the following particularities, which naturally fall within the scope of this invention.

Each lever, of which one, the lever 1 for example, is represented in side elevation and plan view, respectively, in FIGURES 17 and 18, consists of a steel tube of the boiler type, which is highly resistant to fire and of circular or square, but constant, cross-section. The said tube is wound about the corresponding shaft 3 or 4, then looped back to provide a degree of overhang spaced from the shaft, in a manner that is clearly shown in FIGURES 17 and 18, in order to form the hub, the lever arm and the heel thereof, in accordance with the desired profile.

As is likewise manifest from FIGURES 17 and 18, such shaping is not effected entirely in the same plane, the object being to avoid forks at the crossover points and to ensure a continuous and uniform flow throughout the length of the tube.

Lastly, it may be noted that one of the extremities of the tubing forming the lever arm, namely the water inlet extremity 9, is connected radially to the hollow shaft which, as will be explained hereinafter, acts as a water inlet manifold, while the other extremity of the tube, namely the outlet 10, is led out of the furnace (see FIGURE 15), thereby enabling that part of the cooling circuit which is pertinent to the arm formed by the tube to be monitored and regulated.

Each shaft 3 or 4, of which one, the shaft 3 for instance, is shown in longitudinal section in FIGURE 19, acts as a water manifold both for its own cooling and for cooling the levers united to it. Such a shaft consists of a steel tube 3 highly resistant to fire (of the boiler type), wherein is disposed a core with surrounding helix, which leaves, between the wall of the core and the inner surface of the tube, a passageway of rectangular section 11 which develops spirally along the length of the tube.

This form of water intake through a spiral conduit is designed to ensure uniform cooling for the shaft and a uniform rate of flow at all points. Accordingly, the rectangular section 11 of the spiral inlet passageway is at first equal to the sum of the passageway sections 10 of the pair of levers 1 (or 2), plus the passageway section 12 over the zone level with the bearing located past the two levers.

Past the tap corresponding to the first lever, the section 11 reduces to a section 13 which is equal to the sum of the lever section remaining to be supplied, plus the flow section 12; and lastly, past the tap corresponding to the second lever, the inlet section, which is still spiral, reduces to the section 12 required to cool the shaft in the bearing zone. As already stated, the return flow of the water which has circulated through the two levers, is effected separately, by leading the tubes constituting said levers out of the furnace. The outflow of residual water after the levers have been supplied, to wit that in the section 12, is effected via a passageway 20, of section equal to the section 12, which is drilled along the axis of the core, from the end of the core on the same side as the interior bearing, and this residual water debouches at 21 at the other end of the core, i.e. outside the furnace.

Briefly, it will be seen from the foregoing that the main inlet section 14 (FIGURE 15) which is equal to the section 11, is also equal to twice the outlet section 10 plus the outlet conduit section 20.

Since the cooling water inlet and outlets of each shaft/levers assembly are mobile—being fixed to that extremity of the rotatable shaft which is external to the furnace—the main inlet 14 will require to be connected to the main furnace water supply circuit through a flexible hose or through piping with rotary joints, whereas the water emerging from 10, 10 and 20 may flow freely into a suitable funnel connected to the main water recovery conduit.

The end bearings 7 of the shafts 3 and 4 of each turn-over group in the furnace (see FIGURE 20), consist merely of two interconnected and adjacent square tubes 15, which form two cradles on which are journaled the corresponding extremities of the shafts 3 and 4, the two tubes 15 being reinforced by a bearer tube 16.

All these tubes use a one-way water circulation, the inlet and outlet for which are fixed inside the furnace, this being a well known practice customarily resorted to in furnaces.

Since the extremities of the shafts 3 and 4 must obviously rotate in these bearings in the dry state, being required to operate in a very hot environment, the journaling surfaces on the shafts and the tubes are provided with carefully polished, welded bearing shells 17 and 18, made of an alloy comprising 55–80% of cobalt, 20–35% of chromium and small amount of tungsten, sold under the trade name of "Stellite" or a like material, which are generously dimensioned to enable them to satisfy the requirement of operation in the dry state. Finally, in order to protect the bearings against scale dropping off the slabs travelling above them, the same are provided with refractory parts shaped as at 19. These parts are adapted to be removable, in order to facilitate withdrawal of the lever and shaft assemblies from the furnce, as started precdingly.

Whereas the levers, shafts and bearings have been described as being cooled by water circulation, it will of course be understood that they may, if desired, be cooled by circulating steam alone or an emulsion of water and steam, without in any way modifying the construction except insofar as the outflow is concerned, which, in the case of steam, would require to take place in a closed circuit and not out into the open air, as is possible with water.

The invention has been described on the assumption that the turn-over device is situated inside a furnace. However, it will be understood that, in its broader aspects, this invention is applicable to all furnace assemblies wherein the turn-over system may be placed intermediate two distinct furnaces adapted to jointly provide a symmetrical heating devoid of "black traces," up to temperatures of the order of 1250° C., for example.

It should lastly be noted that, in addition to the advantages set forth hereinbefore, this invention allows restricting the temperature to which the work is heated to a temperature below that commonly accepted in furnaces resorted to heretofore, wherein a defect of heating asymmetry may exist. This in turn enables not only rolling to a small thickness, but also rollings that are less prone to tears at the points where bends occur in the work.

What is claimed is:

1. A method of heating plate-like slabs including the steps of pushing said slabs along a guide surface of a heating zone with one major surface of each slab engaging said guide surface; engaging said slabs one by one as they reach the end of said heating zone on said one major surface and on the leading edge surface thereof, swinging said slab through an arc while said edge surface thereof remains engaged and engaging during the swinging movement the other major surface of said slab so as to transfer said slab in a shockfree manner from the end of said heating zone to the beginning of an equalization zone longitudinally spaced from the end of the heating zone with the other major surface of said slab engaging a guide surface in said equalization zone; and moving said slabs through said equalization zone with said other major surface of said slab remaining in engagement with said guide surface of said equalization zone while equalizing the temperatures of the opposite major surfaces of said slab.

2. A heating furnace for heating plate-like slabs or the like comprising, in combination, a heating zone for heating the slabs, said heating zone having a guide surface; pusher means for pushing a plurality of slabs in one direction along said guide surface with one major surface of said slabs engaging said guide surface so that said slabs while being pushed along said guide surface are heated at the other major surface thereof to a predetermined temperature; an equalization zone spaced from said heating zone in said one direction for equalizing the temperature at the opposite major surfaces of said slabs; turnover and transfer means between said heating zone and said equalization zone and comprising a pair of lever means arranged respectively upstream and downstream with respect to the direction of travel of the slabs for engaging a slab at the end of said heating zone, for swinging said slab through an arc while the same remains engaged by said lever means and for transferring the slab in a shockfree manner from the end of said heating zone to the beginning of said equalization zone with the other major surface of said slab engaging a guide surface in said equalization zone; and means for moving said slabs through said equalization zone.

3. A heating furnace as set forth in claim 2 in which said guide surface of said equalizing zone is formed by refractory longitudinal girders along which said slabs travel with said other major surface thereof engaging said girders whereby temperature drop of said other major surface is reduced to a minimum while the one major surface is heated up during travel of the slab through the equalization zone so that the two major surfaces of the slabs leaving the furnace are at substantially identical temperature.

4. A heating furnace as set forth in claim 2 in which each of said lever means includes a set of lever arms and each arm is formed at one end thereof with a heel having a supporting surface extending substantially normal to the lever arm and being arranged to support an edge surface of a slab during swinging thereof through said arc.

5. A heating furnace as set forth in claim 4 and including two shaft means one for each of said lever means arranged spaced from and substantially parallel to each other and supporting said lever means in the region of said one end thereof for pivotal movement through an angle of substantially 100 to 110° from a starting position in which said lever arms and said supporting surfaces of the heels thereof are below said guide surfaces with said lever arms extending away from each other; turning means connected to said lever means for turning the same through said angle; and control means connected with said turning means for causing said lever means to turn first at different speeds from said starting position toward each other until the arms of the two lever means are substantially parallel to each other so that the arms of the upstream lever means engage said one major surface of the slab at the end of said heating zone while the leading edge surface of said slab will be seated against the support surfaces on the heels of said arms of said upstream lever means, to turn then, before the upstream lever means has reached a vertical position, both of said lever means in a common direction which is the initial direction of the upstream lever means until the latter is swung beyond a vertical position, and then to reverse the direction of rotation of the upstream lever means so that both of the lever means return to their starting position with said edge surface of said slab seated against the support surfaces on the heels of the arms of the downstream lever means and the arms of the downstream lever means engaging the other major surface of said slab.

6. A heating furnace as set forth in claim 5 wherein the spacing between said two parallel shaft means is adjustable.

7. A heating furnace as set forth in claim 5 and including an internal circuit for cooling said lever means and said shaft means, said internal circuit constructed to cause a cooling fluid path therethrough to flow at substantially constant speed through all parts of the circuit and to be substantially uniformly spaced from the outer surface of said lever means and said shaft means.

8. A heating furnace as set forth in claim 5 wherein each of said lever arms and said heel thereon are formed by a continuous steel tube of uniform cross section which is wound about the corresponding shaft means and then looped back to provide an overhang spaced from the shaft.

9. A heating furnace as claimed in claim 8, wherein a portion of the tube forming the lever means is wound in form of convolutions about the corresponding shaft means, and wherein the lever arm and the heel of said lever means are integral with spaced portions of said convolutions so as to lie in different planes to ensure a continuous and uniform flow of the cooling fluid throughout the length of said tube.

10. A heating furnace as claimed in claim 5, wherein each of said shaft means comprises a steel tube which is highly resistant to fire, a core extending longitudinally through the interior of said tube spaced from the inner surface of the latter, and a helix means wound on the outer surface of said core and defining a passageway of rectangular cross-section which develops spirally along the length of the tube between said core and the inner surface of said tube.

11. A heating furnace as claimed in claim 5, comprising end bearings which support said shaft means inside the heating furnace, said bearings consisting of two adjoining square tubes having each a semi-circular configuration so as to be adapted to form two cradles.

References Cited by the Examiner

UNITED STATES PATENTS

| | | | |
|---|---|---|---|
| 357,737 | 2/87 | Streeter | 308—77 |
| 1,572,566 | 2/26 | Siemens | 263—6 |
| 1,973,934 | 9/34 | Stevens | 263—6 |
| 2,214,234 | 9/40 | Meyer | 263—6 |
| 2,271,213 | 1/42 | Weidner et al. | 263—6 X |
| 2,298,149 | 10/42 | Morton | 263—6 X |
| 2,595,904 | 5/52 | Swart | 308—8.2 |
| 2,620,174 | 12/57 | Passafaro | 263—6 |

FOREIGN PATENTS

| | | |
|---|---|---|
| 181,868 | 5/55 | Austria. |
| 28,815 | 11/21 | Denmark. |
| 513,524 | 11/30 | Germany. |

CHARLES SUKALO, *Primary Examiner.*

JOHN J. CAMBY, PERCY L. PATRICK, *Examiners.*